Dec. 13, 1927.

M. J. MORTON

GREASE DISPENSING DEVICE

Original Filed Feb. 20, 1926

1,652,318

INVENTOR
M. J. Morton
BY
ATTORNEY

Patented Dec. 13, 1927.

1,652,318

UNITED STATES PATENT OFFICE.

MARSHALL J. MORTON, OF STOCKTON, CALIFORNIA.

GREASE-DISPENSING DEVICE.

Application filed February 20, 1926, Serial No. 89,740. Renewed October 18, 1927.

This invention relates to improvements in devices for metering liquids or semi-liquids, and particularly deals with a device especially intended for use by garage and service station men to dispense grease and the like.

Such stations are frequently called upon to feed grease to different housings of an automobile from a bulk supply, and it is of course to the advantage of both the service station man and to his customer to know just how much grease or oil is being dispensed.

The principal object of my invention therefore is to provide a device for this purpose by means of which an accurate and controlled amount of grease will be dispensed with each movement of a control handle. For instance supposing a device is made to hold a pint of the liquid, six movements of the control handle will indicate that six pints—no more and no less—have been dispensed.

The parts of the device are constructed in such a way that there is very little likelihood of any leakage taking place, such as would render the amount dispensed to be inaccurate.

A further object of the invention is to provide means for enabling grease to be dispensed from the device without such grease passing through the metering structure if desired.

While the device is especially intended for the above purpose, it is also suitable for the dispensing of gasoline and other liquids.

A further object of the invention is to produce a simple and inexpensive device and yet one which will be exceedingly effective for the purpose for which it is designed.

These objects I accomplish by means of such structure and relative arrangement of parts as will fully appear by a persual of the following specification and claims.

In the drawings similar characters of reference indicate corresponding parts in the several views.

Figure 1:
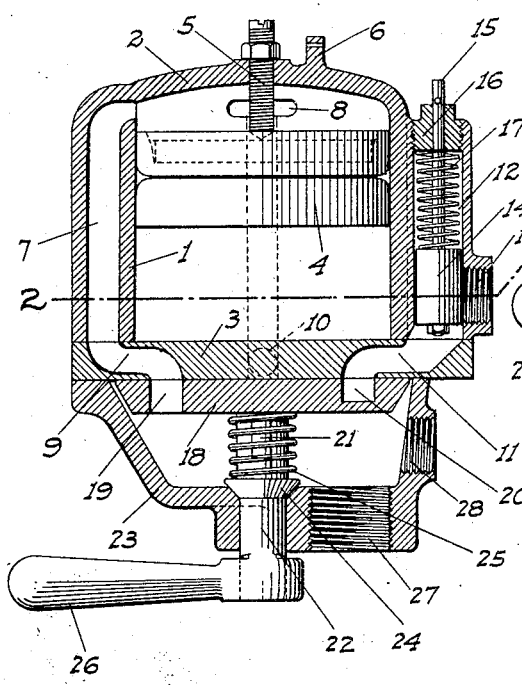
Fig. 1 is a sectional elevation of the device.
Figure 2:
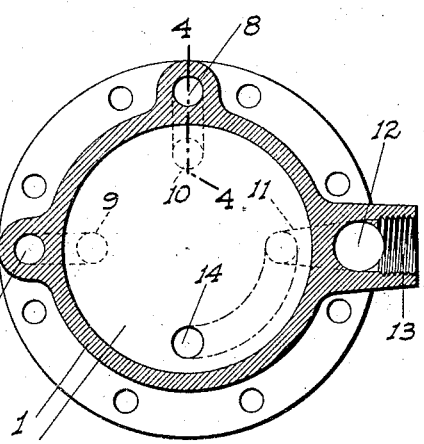
Fig. 2 is a cross section on the line 2—2 of Fig. 1.
Figure 3:
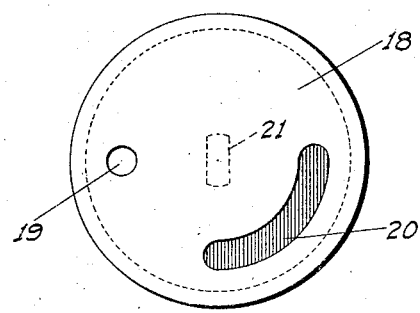
Fig. 3 is a top plan view of the control valve of the device.
Figure 4:
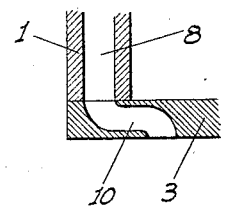
Fig. 4 is a fragmentary cross section on the line 4—4 of Fig. 2.

Referring now more particularly to the characters of reference on the drawings, the numeral 1 denotes a cylindrical body of suitable length having an integrally formed head 2 at one end and a cover plate 3 at the other, preferably formed as a separate element. This is necessary for the purpose of construction but the plate may be used as a unitary part of the body and is so referred to in the claims. A short plunger 4 preferably of the double opposed leather cup type is slidably mounted in the body and is free for movement practically from end to end of the same. An adjustable set screw 5 in the head 2 limits the movement of the plunger in that direction, the plunger being adapted to abut against the plate 3 when it moves in the opposite direction. A fixed transversely orificed lug 6 projects upwardly from the head 2 adjacent the screw 5 to receive a scaling wire to be applied to the screw to prevent the same being turned after a setting has once been made.

Projecting upwardly along the body 1 and communicating therewith between the head and the plunger are passages 7 and 8, the opposite ends of said passages communicating with other passages 9 and 10 respectively formed in the plate 3 and terminating in openings on the under side of said plate. Another passage 11 extends from the bottom of the plate 3 to a cylindrical passage 12 formed in the side of the body and having a tapped side outlet 13 to which a dispensing hose may be attached. The plate 3 also has a straight orifice 14 therethrough. This orifice and the bottom terminations of the passages 9, 10 and 11 are all concentric with the center of the body and are preferably spaced 90 degrees apart.

The passage 12 has a plunger 14' slidable therein, which plunger has a stem 15 projecting upwardly through a guide head 16 on top of said passage. A spring 17 about the stem 15 between the head 16 and the plunger normally maintains the latter in its lowermost position closing the side outlet 13.

Abutted against the under face of the plate 3 is a disc valve 18 having a straight hole 19 therethrough and a curved groove 20 in its upper face, one end of said groove being 90 degrees from the hole 19 and having an arcuate length of 90 degrees. The hole 19 and groove 20 are concentric with the orifice 14 and the other passage openings, and having the same arcuate spacing as said various openings, it will be seen that the hole 19 may register with the passage 9, while the groove 20 registers simultaneously with the orifice 14 and passage 11; or the hole 19 may register with the orifice 14 while the groove 20 registers simultaneously with the passages 10 and 11.

The valve has a downwardly projecting and substantially rectangular stem 21 which has a slidable and non-turnable fit in a spindle 22. This spindle is turnably mounted in a cap 23 secured to the plate 3 and cylinder 1 in spaced relation to the valve. This spindle is provided with a tapered flange 24 which has a seat in a similarly shaped recess inside the cap. A compression spring 25 about the spindle presses the valve constantly against the plate 3 and the flange 24 into its seat. In this manner leakage past the spindle and between the valve and plate 3 is prevented at all times, since the spring takes up wear as it occurs. A turning handle 26 is applied to the outer end of the spindle.

The cap 23 has an intake opening 27 in its bottom to one side of the spindle, for connection to a supply pipe or to a tank in which grease or other material being dispensed is maintained under a suitable pressure. The cap also has a tapped side outlet 28 below the valve, for connection to a hose or to receive a plug.

In operation it will therefore be seen that if the valve is turned to place the opening 19 into alinement with the passage 9, and the groove 20 into alinement with the opening 14 and passage 11, grease will be fed through the passage 7 to the corresponding end of the cylinder and will bear against the plunger at that end. The grease being under pressure said plunger will be forced toward the opposite end of the cylinder and with this movement a previous charge of grease in the cylinder below the plunger will be forced by the movement of the latter through the opening 14, along the groove 20 into the passage 11 and thence to the outlet 13.

When the plunger has reached the opposite end of the cylinder the valve is reversed in position so that the openings 19 and 14 register and the groove 20 registers with the passages 11 and 10. Grease will then enter the body through the opening 14, the plunger will move in the opposite direction and the grease already fed into the body from the opposite end will now be forced out through the passages 8 and 10 to the groove 20 and thence to the outlet. These movements are of course carried out as many times as may be necessary to dispense the required amount of grease.

It will be noted that before any grease can pass through the outlet 13, it must first raise the plunger 14'. This of course causes the stem 15 to raise also, and the stem thus provides a visible indication to the operator as to whether any grease is passing through the outlet or not. As soon as the body is emptied of grease the plunger 14' returns to its outlet closing position by reason of the spring 17.

It will be seen that with the movement of the plunger in either direction the same amount of grease will be dispensed in both cases. The set screw 5 is provided for the purpose of enabling the distance through which the plunger 4 may travel to be accurately set so that the amount dispensed will be an exact unit of measurement such as a pint or a quart, or whatever size capacity the device may be made to have.

If it is not desired to measure the grease to be dispensed, the valve is moved to a neutral position, so that it does not register with any of the plate openings and the grease is allowed to pass directly out of the outlet 28. This enables small amounts of grease, less than the capacity of the body to be dispensed without having to operate the metering structure and interfere with the accurate metering of grease for a subsequent customer.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A liquid dispensing device comprising a hollow body closed at both ends, a plunger slidable in the body from end to end thereof, passage means from the opposite ends of the body, a single outlet passage, said passage means terminating at one end in openings located in spaced relation in a common plane, a cap having an intake opening, secured to the body and surrounding all said openings, and a valve member turnable in said cap, said valve having a groove to register with either of the body-passage openings and the outlet-passage alternately, and having an orifice therethrough then registering with the other body-passage opening and the intake opening.

2. A liquid dispensing device comprising a hollow body closed at both ends and having a plurality of passages between the opposite ends thereof, a plunger slidable in the body, an outlet passage, a valve mounted on the body, a cap on the body over the valve having an intake passage therein, passage means in the valve to place the body passages into alternate communication with the outlet and intake passages, means for turning the valve to such positions and to a neutral position, and an auxiliary outlet from the cap to enable liquid to pass from the intake to the auxiliary outlet without passing through the body.

In testimony whereof I affix my signature.

MARSHALL J. MORTON.